(12) United States Patent
Russo et al.

(10) Patent No.: US 6,330,345 B1
(45) Date of Patent: *Dec. 11, 2001

(54) AUTOMATIC ADJUSTMENT PROCESSING FOR SENSOR DEVICES

(75) Inventors: Anthony P. Russo, Upper Montclair; Lawrence O'Gorman, Madison, both of NJ (US)

(73) Assignee: Veridicom, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/971,455

(22) Filed: Nov. 17, 1997

(51) Int. Cl.⁷ ........................................ G06K 9/00
(52) U.S. Cl. .................. 382/115; 382/124; 382/126; 382/275; 382/318; 348/218; 348/229; 358/446; 358/463; 358/483; 358/504
(58) Field of Search .................... 382/115, 124, 382/125, 126, 127, 318, 319, 312, 274, 275; 348/218, 229; 358/504, 483, 446, 463

(56) References Cited

U.S. PATENT DOCUMENTS

| | | | |
|---|---|---|---|
| 3,949,162 | * | 4/1976 | Malueg ................................. 178/7.1 |
| 4,194,220 | * | 3/1980 | Frame .................................. 358/221 |
| 4,343,021 | * | 8/1982 | Frame .................................. 358/213 |
| 4,408,231 | * | 10/1983 | Bushaw et al. ................... 340/146.3 |
| 4,525,741 | * | 6/1985 | Chahal et al. ...................... 358/209 |
| 4,638,365 | * | 1/1987 | Kato .................................... 358/211 |
| 4,639,781 | * | 1/1987 | Rucci et al. ......................... 358/163 |
| 4,933,976 | * | 6/1990 | Fishbine et al. ........................ 382/4 |
| 4,991,127 | * | 2/1991 | Crookshanks ........................ 364/518 |
| 5,047,861 | * | 9/1991 | Houchin et al. ................. 358/213.15 |
| 5,151,945 | * | 9/1992 | Lee et al. ................................ 382/1 |
| 5,325,442 | * | 6/1994 | Knapp ...................................... 382/4 |
| 5,467,403 | * | 11/1995 | Fishbine et al. ...................... 382/116 |

(List continued on next page.)

FOREIGN PATENT DOCUMENTS 0813164   12/1997   (EP) .

*Primary Examiner*—Matthew C. Bella
*Assistant Examiner*—Sheela Chawan
(74) *Attorney, Agent, or Firm*—Gibbons, Del Deo, Dolan, Griffinger & Vecchione

(57) ABSTRACT

A system and method for automatically determining a set of default settings (with respect to a blank image) so that a uniform and high contrast image results when, for example, a finger is present on a sensor device. A background noise image and other diagnostic data, such as non-functional areas, are also automatically determined with respect to the blank image and stored for future reference. The above processing is performed each time the sensor device is initialized. Once the initialization process is complete, the individual places the required biometric feature, for example, a finger on the sensor device. The methodology adjusts the set of default settings to account for the condition of the biometric feature being imaged by increasing or decreasing the sensitivity level of the sensor device. The determination of optimum sets is achieved by analyzing specific regions of the image data rather than the entire image. The present invention then captures multiple images at different sensitivity levels since a specific region may be optimized with respect to one set of settings and another region may be optimized with respect to another set of settings. The diagnostic data is then used to correct the captured images by substituting any non-functional areas in the sensor device with average intensity values from neighboring regions. The multiple images are then combined to form a resultant image by using a weighted and intensity-transformed combination of regions from the different images.

20 Claims, 6 Drawing Sheets

U.S. PATENT DOCUMENTS

| | | | | |
|---|---|---|---|---|
| 5,524,069 | * | 6/1996 | Inoue | 382/128 |
| 5,544,338 | * | 8/1996 | Forslund | 395/400 |
| 5,613,013 | * | 3/1997 | Schuette | 382/124 |
| 5,692,065 | * | 11/1997 | Prakash et al. | 382/112 |
| 5,838,306 | | 11/1998 | O'Connor et al. | 382/124 |
| 5,914,748 | * | 6/1999 | Parulski et al. | 348/239 |
| 5,920,640 | * | 7/1999 | Salatino et al. | 382/124 |
| 5,942,761 | * | 8/1999 | Tuli | 250/556 |
| 6,177,958 | * | 1/2001 | Anderson | 348/362 |

* cited by examiner

AUTOMATIC ADJUSTMENT PROCESSING FOR SENSOR DEVICES

RELATED APPLICATIONS

The present patent application is related to U.S. patent application Ser. No. 08/855,230, entitled "Capacitive Fingerprint Sensor device With Adjustable Gain," by inventors Alexander G. Dickinson, Ross McPherson, Sunetra Mendis and Paul C. Ross and having a filing date of May 13, 1997, and having common assignees. This patent application hereby incorporates by reference the above-referenced patent application.

FIELD OF THE INVENTION

The present invention relates to sensor devices, and more particularly to a method and apparatus that accounts for device variabilities and adjusts for variable conditions that are present when imaging an individual's biometric feature and in particular, a fingerprint image.

BACKGROUND OF THE INVENTION

Biometric-oriented personal identification techniques are becoming increasingly important in protecting personal property, such as laptop computers and cellular phones, preventing credit card and calling card fraud, limiting access to security areas, computers and information, and ensuring security for electronic commerce. Biometric identification techniques employ physical traits, measurements and other characteristics specific to an individual. These characteristics include, but are not limited to, voice prints, hand prints, fingerprints, retina patterns, and signature analysis. Typically, biometric identification and verification techniques compare an individual's stored biometric data against newly obtained biometric data when the individual desires use of a protected item, or access to a protected area or information. Due to its inherent nature, biometric data has the advantage of always being available for user identification and verification. However, also by its inherent nature, due to the vagaries of the human body, biometric data is often difficult to acquire in a consistent manner to yield an unambiguous measure of identity.

The fingerprint biometric is probably the most widely used and researched biometric identification technique. Existing technology allows the relevant features of a fingerprint to be represented in a few hundred bytes of data. Furthermore, the computer hardware required for recording and comparing fingerprint data can be centralized and accessed through a telecommunications network thereby allowing costs to be amortized across many transactions.

The disadvantage of biometric identification and verification, and in particular fingerprint identification, is in acquiring an accurate image of the fingerprint each time an individual desires to use or access the protected item. The problems associated with acquiring an accurate fingerprint image include sensor device dependent variables, such as hardware defects and deterioration, and individual conditions, such as the moisture content and temperature of the feature being imaged.

Accordingly, there is needed a sensor device employing methodology that accounts for sensor device variability, human biometric variability and adjusts for variable conditions that are present when imaging an individual's biometric features.

SUMMARY OF THE INVENTION

The present invention is an apparatus and a method that increases accuracy and reliability of biometric identification and verification techniques. An increase in accuracy and reliability is achieved by automatically accounting for sensor device variations and adjusting for variable conditions that are present when preparing to capture an image of an individual's biometric feature. The present invention optimally adjusts for the condition of an individual's biometric features and captures multiple images at different optimized sensitivity settings in a relatively small time frame, such that capture and adjustment processing is transparent to the individual.

In an exemplary embodiment, the present invention automatically determines a set of default settings and diagnostic data for a sensor device first based on a blank image. At least one set of optimized settings is then determined by automatically adjusting the set of default settings based on the condition of the individual's biometric feature. Images are then captured of the feature, where the number of images taken corresponds to the number of optimized sets. The methodology corrects the captured image or images with the previously stored diagnostic data. If multiple images are captured, the present invention combines the corrected images to form a resultant image that is of higher quality than any of the single images.

Advantageously, the invention automatically determines default settings that provide for a substantially uniform and high contrast image by accounting for device variations. The default settings are adjusted for the variable conditions of the feature being imaged, for example, whether a finger is too wet or too dry, by examining a specific set of regions of the image data rather than the entire image.

In one exemplary embodiment of the present invention, multiple images are captured at different sensitivity levels to permit greater accuracy in identification. The captured images are corrected with previously determined and stored diagnostic data, such as non-functional pixel regions. The multiple images are then combined by using a weighted and intensity-translated combination of regions from the different images to form a resultant image.

BRIEF DESCRIPTION OF THE FIGURES

For a better understanding of the present invention, reference may be had to the following description of exemplary embodiments thereof, considered in conjunction with the accompanying drawings, in which.

DETAILED DESCRIPTION OF THE DRAWINGS

Figure 1:
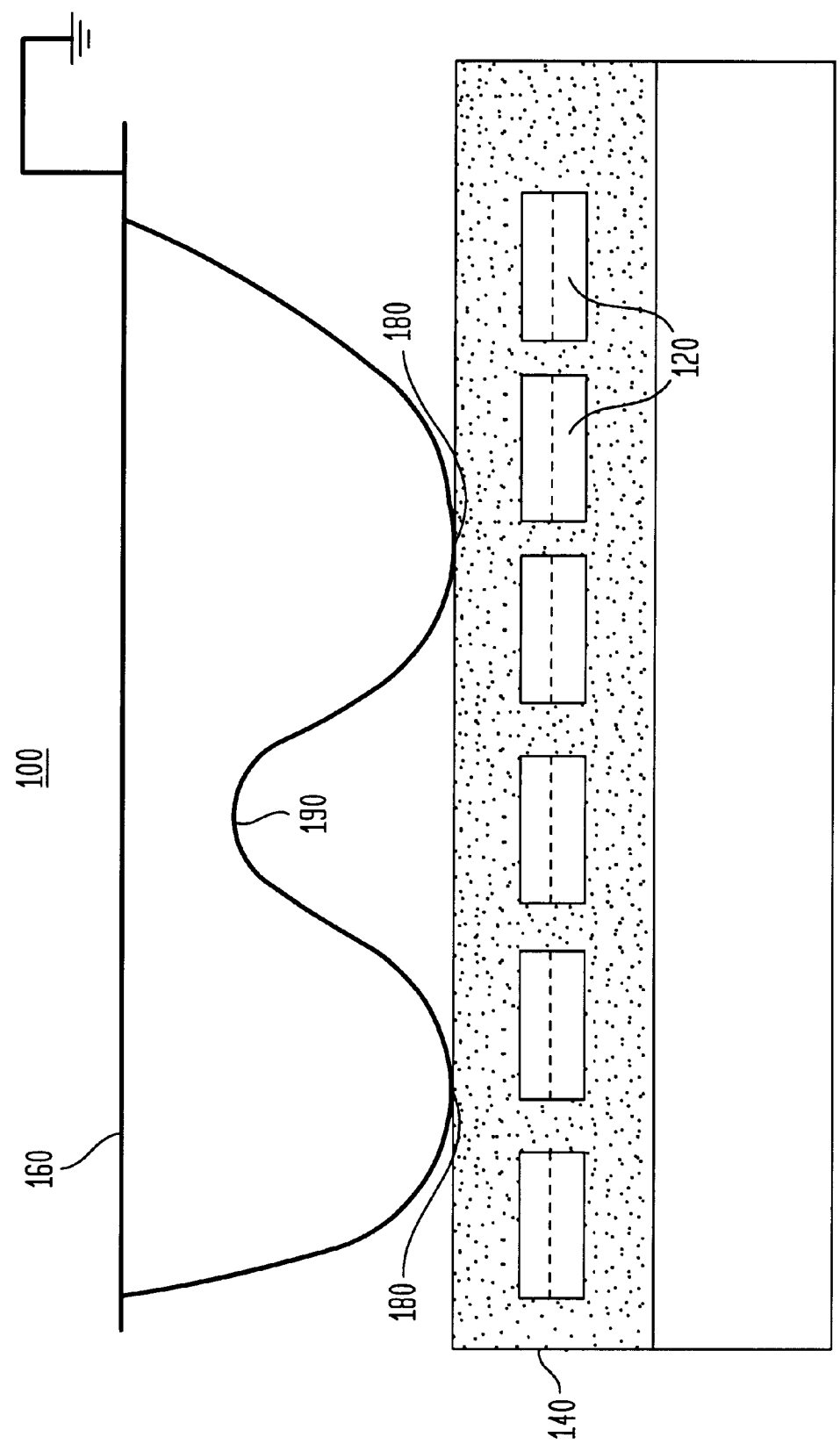
FIG. 1 shows a cross-sectional view of an array of sense elements located below two fingerprint ridges of a finger surface in accordance with an exemplary embodiment of a sensor device used in the present invention.

For clarity of explanation, the illustrative embodiment of the present invention is presented as comprising individual functional blocks (including functional blocks labeled as "processors"). The function s these blocks represent may be provided through the use of either shared or dedicated hardware, including, but not limited to, hardware capable of executing software. For example the functions of processors presented in FIGS. 2–3 may be provided by a single shared processor. (Use of the term "processor" should not, however, be construed to refer exclusively to hardware capable of executing software.)

Illustrative embodiments may comprise microprocessor and/or digital signal processor ("DSP") hardware, read-only memory ("ROM") for storing software performing the operations discussed below, and random access memory ("RAM") for storing results. Very large scale integration ("VLSI") hardware embodiments, as well as custom VLSI circuitry in combination with a general purpose DSP circuit, may also be provided.

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and the scope of the invention. Thus, the present invention is not intended to be limited to the embodiments disclosed, but is to be accorded the widest scope consistent with the principles and features disclosed herein. In particular, although the present invention will be described in terms of fingerprint identification, one of ordinary skill in the art will recognize that the invention is more generally applicable to other individual biometric features.

For purposes of clarity, a top level functional overview of the present invention is presented, followed by an exemplary embodiment of a sensor device and a system incorporating the methodology of the present invention. A more detailed explanation of the methodology is then presented.

In general, the present invention automatically determines a set of default settings (with respect to a blank image) so that a uniform and high contrast image results when, for example, a finger is present on the sensor device. As implied, a blank image is an image taken without a finger being applied to the sensor device. A background noise image and other diagnostic data, such as non-functional regions which are commonly referred to as "dead pixels or regions", are also automatically determined with respect to the blank image and stored for future reference. The above processing is performed each time the sensor device is initialized.

Once the initialization process is completed, an individual can place the required feature, for example, a finger on the sensor device. The invention then adjusts the set of default settings to account for variable conditions that are present when imaging an individual's biometric feature by increasing or decreasing the sensitivity level of the sensor device. The determination of the optimum sets is achieved by analyzing specific regions of the image data rather than the entire image. This increases computational efficiency and permits multiple image data to be captured at different sensitivity levels in a short period of time. Accuracy is generally increased when using multiple images since one region may be optimized with respect to one set of settings and another region with respect to another set of settings. The diagnostic data is then used to correct the captured images by substituting any dead regions in the sensor device with average intensity values from neighboring regions. The multiple images are then combined by using a weighted and intensity-transformed combination of regions from the different images to achieve maximal overall contrast and quality. Accordingly, the present invention produces a resultant image that accounts for device variations and adjusts for the condition of an individual's biometric feature.

Referring to FIG. 1, there is shown an exemplary embodiment of a fingerprint sensor device 100 that can be used in conjunction with the present invention, and is explained in related U.S. patent application Ser. No. 08/893,668, entitled "Capacitive Fingerprint Sensor Device With Adjustable Gain," by inventors Alexander G. Dickinson, Ross McPherson, Sunetra Mendis and Paul C. Ross and having a filing date of May 13, 1997, and having common assignees. This patent application hereby incorporates by reference the above-referenced patent application.

Fingerprint sensor device 100 contains an array of sense elements 120 (also referred to as electrodes or capacitor plates). FIG. 1 also illustrates a finger surface 160 which is placed in close proximity to sensing surface 140. Because finger surface 160 is uneven, certain portions of the finger surface 160 (ridges 180) will be in close proximity to the sensing surface 140, while other portions (valleys 190) will be farther from sensing surface 140. Each sense element 120 forms a capacitor with the portion of finger surface 160 located directly thereabove. Sense elements 120 form one set of capacitor plates with the other plate comprising finger surface 160.

When a finger at a known potential, such as ground, is brought in close proximity to sensing surface 140, the capacitance on sense elements 120 changes. The surface of the finger is uneven, with "ridges" and "valleys", typically a few hundred microns apart, forming the "print" of the finger. The ridges of the print will be closer to sensing surface 140, and the valleys will be further away, typically by about 100 microns. Since the capacitance ($C_f$) between a metal plate and finger surface 160 depends on the distance and the material between the two, it will vary with the finger topography.

It is possible then to obtain an image of the fingerprint by measuring capacitance across the array because capacitors formed by a plate-ridge pair will have a much greater capacitance than those formed by a plate-valley pair. Capacitance between these limits will be created in areas of the finger that lie between a ridge and valley. The images from the sensor devices can contain, for example, grey level information, where each sense element 120 or pixel has a digital value ranging from one value that represents white to another value that represents black, with values representing shades of grey in between. In an exemplary embodiment, an 8 bit grey scale can be used to represent 256 shades.

Figure 2:
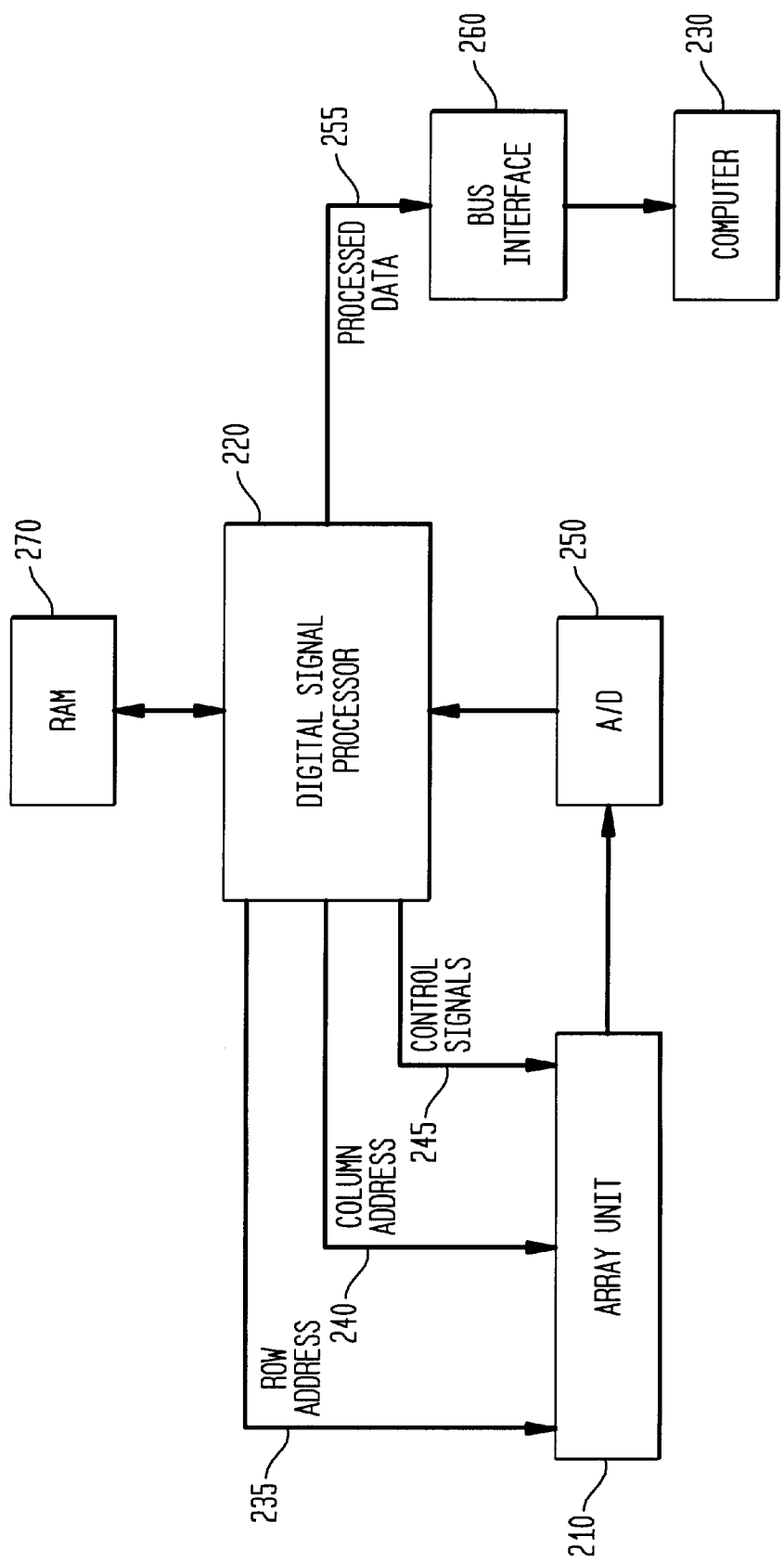
FIG. 2 is a block diagram of an exemplary embodiment of a fingerprint identification and verification system in accordance with the present invention.

Referring now to FIG. 2, there is shown an exemplary embodiment of a fingerprint identification and verification system 200 which uses the methodology of the present invention to identify individuals. System 200 includes an array unit 210 coupled to a computing system that further includes a digital signal processor 220 and a computer 230. Digital signal processor 220 connects to a set of row address lines 235 and a row of column address lines 240 which feed into array unit 210. Digital signal processor 220 also outputs control signal 245, which comprises a plurality of control signals also feeding into array unit 210. The output from array unit 210, which is in analog form, feeds into A/D converter 250. The A/D converter 250 converts the analog signal into a digital signal which feeds into digital signal processor 220. Digital signal processor 220 processes the output from A/D converter 250 and feeds the processed output through processed data line 255 to bus interface 260. Finally, bus interface 260 feeds this output into computer 230.

Operationally, the circuitry in FIG. 2 functions as follows. Digital signal processor 220 feeds a number of signals into array unit 210, including row address 235, column address 240 and control signals 245. These signals cause sense elements in array unit 210 to cycle through charge and discharge cycles to measure capacitance on sense elements within array 210. The output of array unit 210 is then fed into A/D converter 250, which converts the output into digital form which feeds into digital signal processor 220. Digital signal processor 220 takes this output and processes it to create processed data 255, which is transferred through bus interface 260 into computer 260. Digital signal processor uses RAM 270 to store the instructions and code involved in this process.

The present invention evaluates the image to determine whether the image of a fingerprint acquired by array unit 210 is of sufficient quality for identification purposes. If not, digital signal processor 220 feeds control signals 245 into array unit 210 to automatically adjust the gain on sense elements within array unit 210. This gain adjustment may be accomplished by automatically adjusting the timing between samples of the voltage on the sense elements, or alternatively, by automatically adjusting the current flowing through the current source within each sense element by adjusting an external potentiometer. After a number of iterations of gain adjustment have been accomplished, and a satisfactory image has been gathered from array unit 210, processed data 255 is fed through bus interface 260 to computer 230 where the data can be used for a variety for identification purposes.

Figure 3:
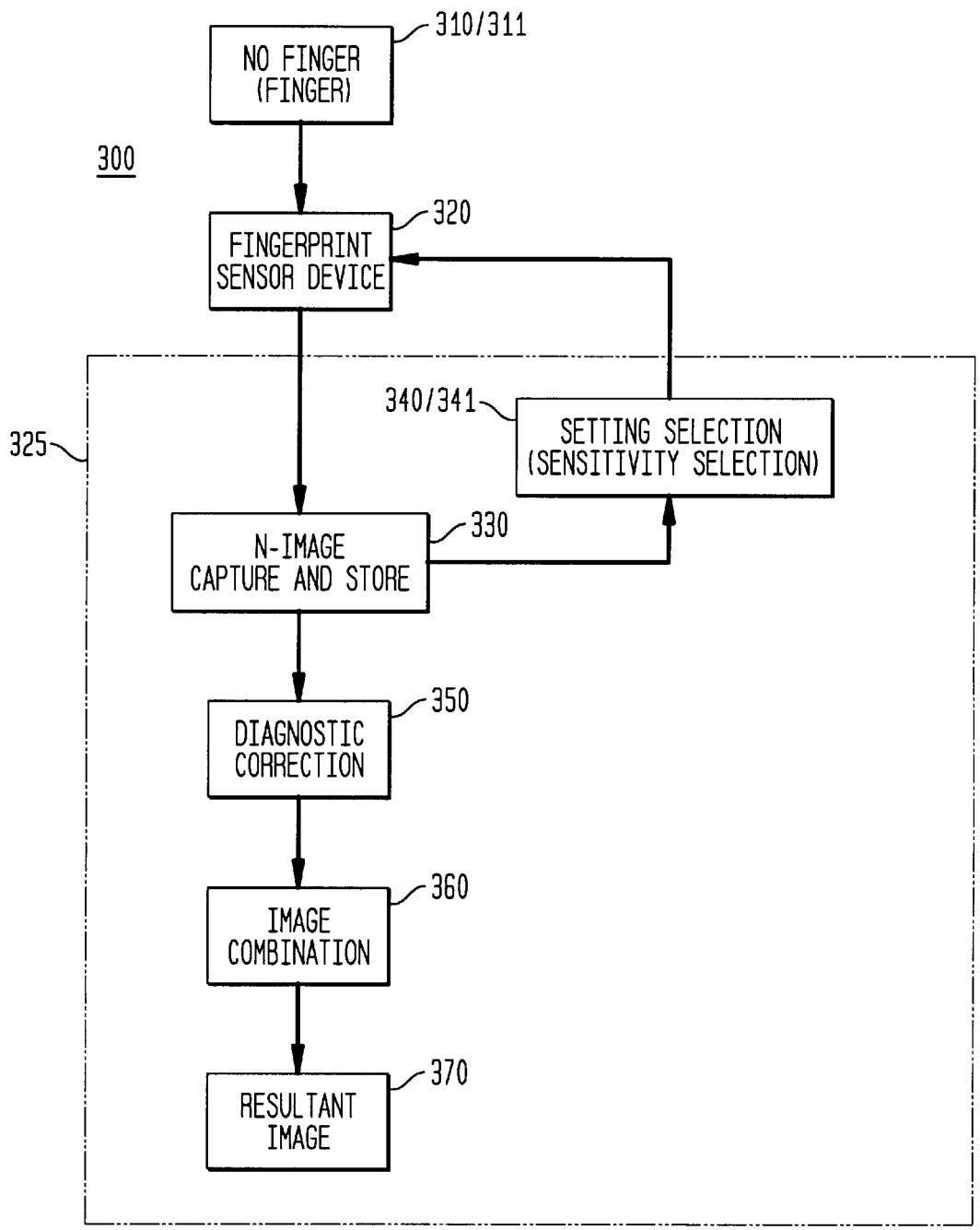
FIG. 3 is a block diagram illustrating the interaction between a sensor device and processor in accordance with the present invention.
Figure 4A:
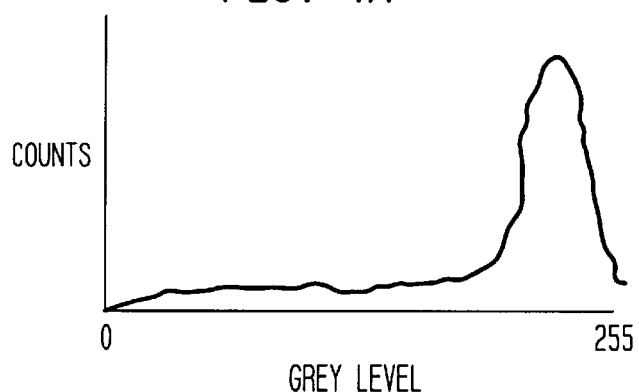
FIGS. 4A, 4B and 4C show histograms for a dry finger condition, a wet finger condition and a normal finger condition.
Figure 4B:
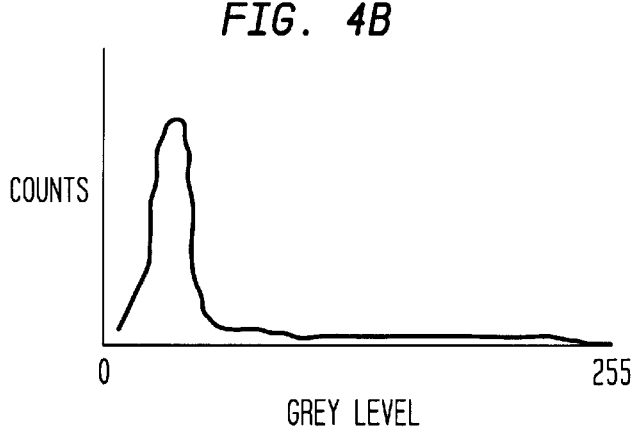
Figure 4C:
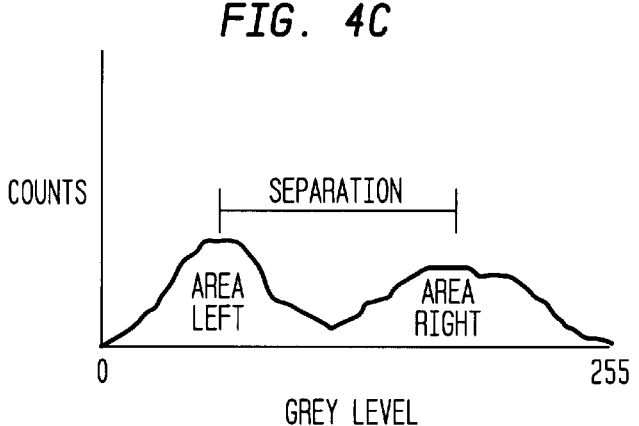

Referring now to FIG. 3, there is shown a more detailed block diagram of the interaction between a sensor device 320 and a processor 325. For purposes of clarity, the present invention is functionally separated into four sections. In an exemplary embodiment of the present invention, each of the four sections is implemented in processor 325. In the first section, a set of default settings for the sensor device are automatically determined based solely on a blank image (without a fingerprint). Background noise and other diagnostic data for the sensor device, such as dead rows or columns, is determined based solely on the blank image. In the third section, the set of default settings are automatically adjusted to optimize for variable conditions that may be present when imaging an individual's biometric feature. The captured image or images from the optimally set sensor device is then corrected using the diagnostic data and if applicable, combined to form the resultant image. Each of the four functional sections is now described in more detail with reference to FIG. 300.

Accurate and reliable identification and verification is increased by setting the sensitivity of the sensor device such that it accounts for device variations. Calibration of the sensor device is automatically achieved by using two different techniques. During initialization of sensor device 320 (when no finger 310 is present on sensor device 320), processor 325 adjusts the settings of sensor device 320, as explained above, until a sensitivity level is determined that will yield a uniform, high-contrast image when a finger is placed on sensor device 320 (330–340). The objective is to automatically determine the settings that yield the best quality image, where the best quality image is defined by a mathematical function. In sum, the mathematical function determines the most uniform image (spatially across the image area) whose minimum intensity values are close to white. This will yield the desired uniform, high-contrast image when a fingerprint is present on the device.

Figure 6A:
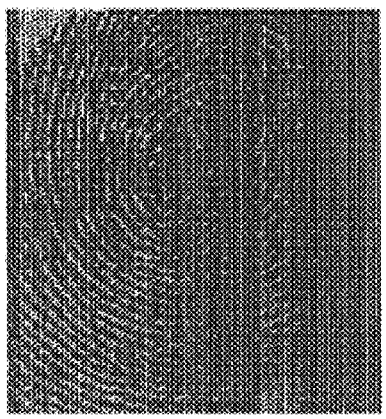
FIGS. 6A, 6B and 6C show a first image, a second image and a resultant image with the background noise removed, respectively, in accordance with the present invention.
Figure 6B:
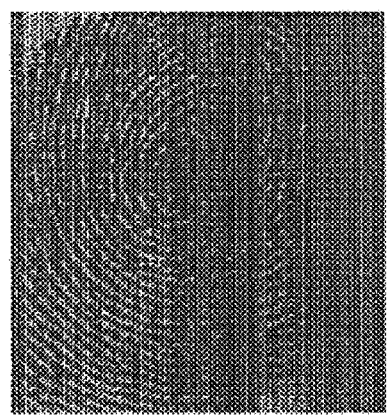
Figure 6C:
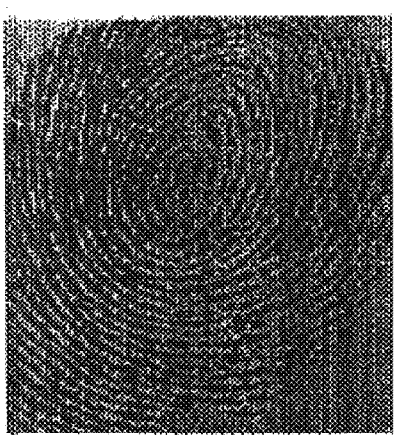

In accordance with the present invention, a quality image is defined by two parameters, uniformity and contrast. FIGS. 6A–6B and 6C illustrate bad quality images and a good quality image (with the background noise removed), respectively. Specifically, the dark bands in FIGS. 6A and 6B represent areas of non-uniformity. Uniformity across the image is achieved by determining the average intensity of a set of defined regions, such as columns or rows, and by computing the range or variance of intensities of each defined region. Maximum contrast capability is achieved by adjusting the settings until the minimum intensity of the original range is translated to zero and the original range is expanded to occupy the full range. These two parameters are balanced across the image to produce the uniform default settings.

The second calibration technique is also performed during initialization and automatically determines diagnostic data that is specific to how sensor device 320 is fabricated. As described below, the exemplary embodiment of sensor device 320 is a solid state device. As such, there is the possibility of "dead areas" or non-functional areas such as dead pixels, or rows, columns and regions of dead pixels. Dead areas result from manufacturing defects or from damage due to electrostatic discharge. This is similar to a memory device where rows and columns may be non-functional. Furthermore, due to variable electronic device characteristics, nodes may have some degree of non-uniformity, which will yield a non-uniform, noisy-image. The present invention automatically determines this diagnostic data from a blank image.

Non-functional areas are determined by calculating the variance along, for example, a region, a row or a column of the image and evaluating whether the variance is zero, that is there is no sensor variation in any of the pixels in the region. If the variance is zero, then the region, row or column is presumed non-functional. Alternatively, dead pixels can be determined by looking for a maximum or minimum intensity value in the pixels. The diagnostic data is stored and used later to correct these defects in the captured images of the fingerprint. In one embodiment of the present invention, a history file of the diagnostic data is kept to track sensor device degradation. The non-uniform background noise image is stored by processor 325 for future reference. Since the image is constantly changing, the background noise image being stored is really a time averaged image of multiple images. Alternatively, a background image can be stored at each of the different sensor sensitivity settings or at specified sensitivity settings. As explained below, the background image or images can be subtracted from the captured image or images.

By performing an adjustment during initialization, the present invention eliminates the disadvantages of conventional devices that are calibrated on a one time basis in a specific region of the world, where certain environmental conditions, such as temperature and humidity, later change from the time of calibration. The present invention automatically determines a set of default settings that account for device variations and different environmental conditions, such as being operated in different regions under drastically different temperature and humidity ranges. As stated above, the first two steps in the methodology are performed during initialization of the sensor device. If desired, a user may re-initialize the sensor device to reset the default settings, to obtain new diagnostic data or to do both.

Figure 5A:
FIGS. 5A, 5B and 5C show images of a dry finger condition, a wet finger condition and a normal finger condition, respectively.
Figure 5B:

Once sensor device 320 is initialized and calibrated, a finger 311 can be placed on sensor device 320. The variable conditions of finger 311, for example, moisture level and cleanliness, can generally detrimentally affect the ability of sensor device 320 to produce a quality image with the default settings. Accordingly, sensor device 320 may yield results that vary, for example, with finger moisture, finger cleanliness and other such variable conditions. FIG. 5A, for example, shows a histogram of when the finger is too dry and FIG. 5B shows a histogram of when the finger is or too wet. The third functional section of the present invention substantially improves the image quality by optimally adjusting the settings while capturing the fingerprint image. This present invention automatically determines the condition of finger 311 and correctly adjusts the sensitivity settings 341 prior to image capture 330. The present invention increases the sensitivity, for example, when the finger is too dry and decreases the sensitivity, for example, when the finger is too wet. Typical fingerprint sensor devices require the user to wet the finger or dry the finger, as needed. The present invention methodology eliminates the need for user interaction by automatically adjusting for the condition of the biometric feature being imaged.

The present invention determines the condition of the finger by examining specific regions of the captured data rather than the total image. The specific regions can be, for example, rows or columns of data from the sensor device that are centrally located on the image, but are separated enough to provide representative samples of the image. In one embodiment of the present invention, the diagnostic data is used to select specific regions that do not contain dead pixels. This ability to analyze the condition of the finger using partial image data is an advantage of using the exemplary embodiment of sensor device 320 discussed herein. Moreover, the present invention system is computationally efficient and is not available with conventional sensor device systems. Specifically, since optical sensor based systems are inherently analog, they must capture the total image. This is a computationally intensive procedure and would generally require a time period that would not be user friendly. In contrast, the present invention accomplishes the analysis of the partial image data in milliseconds and completes the whole process in approximately one second. As such, not only does the present invention generally increase the accuracy of the system, it does so by being transparent to the individual and without any user interaction.

Figure 5C:

The present invention analyzes the image contrast or the ratio of black to white, for example, by examining histograms of the captured data. Specifically, the histograms of gray level data are created for each of the specific regions and combined into a single histogram that represents the image for a given set of settings. This histogram is referred to as, for purposes of clarity, a representative histogram. The settings are varied systematically and a representative histogram is saved for each combination of the settings. In the exemplary embodiment, there are a predefined number of combinations that are selectable by using a look-up table (341). After stepping through all or a subset of the entries in the look-up table (341), the representative histograms for each combination of settings is analyzed by calculating a score for each histogram. Referring to FIGS. 5A, 5B and 5C, an exemplary method for calculating a score first requires determining an area under each peak that is present in the histogram and by determining a separation value between the peaks, if applicable. The score is then set equal to:

SCORE=Separation−ABSOLUTE VALUE (AREA LEFT−AREA RIGHT)

Alternative methods and criteria for evaluating which histogram is the best are also implementable. Using the exemplary method, the histogram that corresponds to the settings that resulted in the image with the most contrast is the histogram that has the highest SCORE. For example, if the analysis of the histogram reveals two distinct peaks of nearly the same height (as shown in FIG. 5C for a normal finger condition), the score would be higher than either histogram shown in FIG. 5A (for a dry finger) or FIG. 5B (for a wet finger). FIGS. 6A, 6B and 6C show fingerprint images corresponding to the histograms of FIG. 5A, 5B and 5C. The proper or optimal settings for sensor device 320 are then those corresponding to the highest score. In one embodiment, a predefined number of the highest scores are used to capture multiple images of the fingerprint. In another embodiment, the setting corresponding to the highest score is selected and multiple images are then taken by selecting additional settings on either side of the optimized setting. This bracketing of the optimized setting permits the invention to take multiple images and make a composite image from the best regions in each image.

In an exemplary embodiment of the present invention, sensor device 320 controls the sensitivity level by varying the discharge time or the discharge voltage. Specifically, sensor device 320 at least has seven different settings for varying the discharge time and at least 100 different settings for varying the discharge voltage. Conventional optical sensor devices cannot adjust for individual finger conditions. As such, the images obtained by such systems are non-optimal. In contrast, the sensitivity selection process of the present invention is continued until a substantially uniform, high-contrast image is obtained as illustrated in FIG. 5C. Since this requires balancing uniformity across the image with the need for high contrast, multiple optimum sensitivity levels may exist. As a result, the present invention method may capture multiple images, one image at each of the optimized sensitivity levels.

The last functional section of the present invention uses the information and images obtained in the first three parts to produce a high quality, resultant image. The image or images captured are first corrected with the diagnostic data obtained in part 2 (350). Specifically, the diagnostic data is used to correct for dead pixels, regions, rows or columns by replacing them with average intensity values from their neighboring pixels or regions. In one embodiment of the present invention, non-uniform background noise is also subtracted from each of these images. In another embodiment, background noise corresponding to each of the settings used is subtracted from the particular image.

If multiple images were captured in section three above, then the present invention uses a weighted and intensity-transformed combination of regions from different images (360) to form a resultant image (370). The weightings are selected such that higher contrast regions of a particular image are chosen over lower contrast regions of the other images to obtain the best overall composite image. Although each of the captured images is a good quality image, there are regions within each image that provide greater contrast than the counterpart regions in the other images. The image combination or composition step takes advantage of this by weighting regions based on contrast levels. This intensity translated weighting is performed region by region per captured image, where a region can be, for example, a row or column.

As stated above, when multiple images are taken they are combined by using an intensity-shifted and weighted combination of regions from different images captured at different settings. The calculation is made using two parameter values: intensity shift and intensity range.

In general, the intensity shift value determines which section of the intensity range the image data is occupying. This is then used to shift the actual intensity values such that the full intensity range is maximally occupied to provide the best potential for image contrast. In an exemplary embodiment, intensity shift is calculated as the difference between a fixed intensity and the average intensity value in the region. In the exemplary embodiment, the value of the fixed intensity is chosen as the middle intensity in the potential, full intensity range. For example, when using an eight bit grey scale, the full intensity range is 0–256 and the middle intensity value is 128. In another embodiment, instead of using the average intensity value in the region, the present invention uses the maximum intensity value, minimum intensity value, or the intensity value corresponding to the maximum or minimum peak in the intensity histogram.

In the exemplary embodiment, the intensity range is determined by calculating the difference between the maximum and minimum intensity value in the region. In another embodiment, the intensity range is a fixed number, n, times the standard deviation of the intensity values in the region, where n is usually small, for example n=1 or 2. In still another embodiment, the intensity range is the intensity difference between the maximum peak on the background intensity histogram and the minimum peak on the image intensity histogram (which represents ridge intensity values). In general, the present invention determines the spread in the grey levels, which is a measure of contrast.

Using the above methods, the present invention calculates the intensity shift and intensity range for each corresponding region in each image. In equation form:

$$\text{Intensity\_Shift}(\text{image}_i, \text{region}_j) = \text{Average\_Intensity}(\text{image}_i, \text{region}_j) - 128$$

$$\text{Intensity\_Range}(\text{image}_i, \text{region}_j) = \text{Max\_Intensity}(\text{image}_i, \text{region}_j) - \text{Min\_Intensity}(\text{image}_i, \text{region}_j)$$

The intensity values in each region are then translated by its intensity shift value to best utilize the full intensity range. For example, if the average intensity of the region is below 128, then the present invention will move each of the pixel intensity values in the region toward the maximum intensity value by the intensity shift value. This is performed pixel by pixel in each region of each image. In equation form:

$$\text{Intensity\_Shifted}_{pixel}(\text{image}_i, \text{region}_j) = \text{Intensity}_{pixel}(\text{image}_i, \text{region}_j) - \text{Intensity\_Shift}(\text{image}_i, \text{region}_j)$$

After performing the intensity shift on each pixel in each region of each image, all corresponding pixels in each image are added. In equation form:

$$\text{Intensity\_Sum}_{pixel}(\text{region}_j) = \text{Sum}(\text{Intensity\_Shifted}_{pixel}(\text{image}_i, \text{region}_j)), i=0, n-1, \text{for } n \text{ images}$$

The intensity sums for each region are then multiplied by a weight to obtain a resultant image, where the available intensity range is maximally occupied by the pixel intensity values in the resultant image. In equation form:

$$\text{Sum\_of\_Ranges}(\text{region}_j) = \text{Sum}(\text{Intensity\_Range}(\text{image}_i, \text{region}_j)), i=0, n-1, \text{for } n \text{ images}$$

$$\text{Weight}(\text{region}_j) = 255/(\text{Sum\_of\_Ranges}(\text{region}_j))$$

$$\text{Intensity\_Resultant}_{pixel} = \text{Intensity\_Sum}_{pixel}(\text{region}_j) \times \text{Weight}(\text{region}_j), \text{for } j = \text{all regions}$$

In one exemplary embodiment of the present invention, the resultant image is obtained by taking the average of the sum of the captured images. In another exemplary embodiment of the present invention, the non-uniform background noise is subtracted from the resultant image. This is illustrated in FIGS. 6A and 6B, where 2 images are combined by averaging and by having their backgrounds subtracted out to form the resultant image shown in FIG. 6C.

As shown herein, the present invention automatically determines a set of default settings given device variability and adjusts these default settings for variable conditions that may be present when imaging the individual's biometric feature. The optimally adjusted settings are then used to capture one or more images for the purpose of yielding the best quality, resultant, single image.

The exemplary embodiment of the fingerprint sensor device for use in conjunction with the present invention methodology and system may be fabricated from any appropriate materials known in the art. In some applications it is advantageous to employ solid state sensor devices that can contain in a single unit the sense elements and associated circuitry to read out the value of each sense element such as, for example, amplifiers, noise reduction circuitry, and analog-to-digital converters. Some examples of suitable integrated circuit devices include devices fabricated by conventional CMOS processing techniques. Such solid state devices are typically covered by a layer of silicon dioxide several microns thick.

The present invention system may be incorporated into a variety of different devices to provide an indication that a person having possession of the device is authorized to use the device. For example, authentication cards such as credit cards, debt cards, smart cards, etc., often require the user to provide a personal identification number (PIN) prior to use. If the card itself is misappropriated, the PIN would not be known to unauthorized users. However, the PIN would be given to, and known by, a merchant when the card holder initiates a transaction. It is also possible for the PIN to be misappropriated by a person who overhears a transaction or observes the cardholder as the PIN is written or entered via a keyboard or by a vendor to whom the customer gives the PIN to authorize themselves.

These problems can be overcome by incorporating the present invention into an authorization card. The card includes circuitry for comparing the acquired fingerprint against those of an authorized user or users, which are stored in a memory incorporated into the card. When the card is presented for use, the user verifies that he or she is an authorized user by placing a finger on the sensor device located on the card.

The present invention fingerprint system also may be incorporated into other validation devices that store fingerprints of authorize users. For example, the fingerprint system may be incorporated into an automated teller machine (ATM). The user would be required to demonstrate that he or she is an authorized user prior to performing a transaction. The fingerprint system also may be incorporated into a validation or authorization device in possession of a merchant at a point of sale, for example.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed is:

1. A method for sensing and analyzing an individual feature, said method comprising the steps of:
   automatically determining a set of default settings for a sensor device based on a blank image;
   automatically adjusting said set of default settings based on variable conditions that may be present when capturing an image of the individual feature;
   capturing multiple images at a corresponding set of settings; and,
   combining said multiple images to form a resultant image,
   wherein said step of automatically adjusting includes the steps of:
   forming at least one set of settings that are optimized for the individual feature; and,
   forming at least one additional set of settings that are optimized for the individual feature;
   said capturing step including:
      capturing a corresponding image for each of said at least one set of settings; and,
      capturing an additional corresponding image for each of said at least one additional set of settings;
   said combining step including:
      combining said corresponding image with said additional corresponding image to form said resultant image.

2. The method according to claim 1, wherein said step of combining includes the steps of:
   determining an intensity shift value for each of a plurality of regions comprising said corresponding image and said additional corresponding image; and,
   determining an intensity range for said each region,
   wherein said intensity shift value and said intensity range are used such that each pixel in said each region maximally occupies an available intensity range in said resultant image.

3. A method for sensing and analyzing an individual feature, said method comprising the steps of:
   automatically determining a set of default settings for a sensor device based on a blank image;
   automatically adjusting said set of default settings based on variable conditions that may be present when capturing an image of the individual feature;
   capturing multiple images at a corresponding set of settings;
   combining said multiple images to form a resultant image; and
   correcting each of said multiple images with stored diagnostic data,
   wherein said step of combining utilizes intensity translated weighting to obtain said resultant image.

4. A method for sensing and analyzing an individual feature, said method comprising the steps of:
   automatically determining a set of default settings for a sensor device based on a blank image;
   automatically adjusting said set of default settings based on variable conditions that may be present when capturing an image of the individual feature;
   capturing multiple images at a corresponding set of settings; and
   combining said multiple images to form a resultant image,
   wherein said determining step includes the steps of:
      dividing an image area of said sensor device into at least two regions;
      calculating average intensity values for said regions;
      computing a variance for each of said regions; and
      adjusting sensor device settings until the minimum intensity in an original intensity range of each said region is translated to zero and said original range is expanded to occupy a full intensity range for each said region.

5. A method for sensing and analyzing an individual feature, said method comprising the steps of:
   automatically determining a set of default settings for a sensor device based on a blank image;
   automatically adjusting said set of default settings based on variable conditions that may be present when capturing an image of the individual feature;
   capturing multiple images at a corresponding set of settings; and
   combining said multiple images to form a resultant image,
   wherein the step of automatically determining includes the steps of:
      analyzing at least one histogram of partially captured data corresponding to at least one set of adjusted settings; and
      selecting at least one set of settings based on said at least one histogram.

6. An apparatus for sensing and analyzing an individual feature, said apparatus comprising:
   a processor for analyzing at least two sets of image data;
   a sensor for providing said at least two sets of image data to said processor;
   said processor determining automatically a set of default settings for said sensor based on a blank image;
   said processor adjusting automatically said set of default settings based on variable conditions that may be present when capturing an image of the individual feature; and,
   means for combining said at least two sets of image data to form a resultant image,
   wherein said processor includes:
      diagnostic correction means for correcting each of said multiple sets of image data with stored diagnostic data,
   wherein said multiple sets of image data are comprised of multiple regions, wherein said means for combining combines said multiple sets of image data region by region using intensity translated weighting for each of said multiple regions to obtain said resultant image.

7. An apparatus for sensing and analyzing an individual feature, said apparatus comprising:
   a processor for analyzing at least two sets of image data;
   a sensor for providing said at least two sets of image data to said processor;
   said processor determining automatically a set of default settings for said sensor based on a blank image;
   said processor adjusting automatically said set of default settings based on variable conditions that may be present when capturing an image of the individual feature; and,
   means for combining said at least two sets of image data to form a resultant image,
   wherein said processor includes:
      diagnostic correction means for correcting each of said multiple sets of image data with stored diagnostic data,
   wherein said means for combining includes:
      means for determining an intensity shift value for each region comprising said multiple sets of image data; and,
      means for determining an intensity range for said each region,
   wherein said processor uses said intensity shift value and intensity range such that each pixel in said each region maximally occupies an available intensity range in said resultant image.

8. An apparatus for sensing and analyzing an individual feature, said apparatus comprising:

a processor for analyzing at least two sets of image data;

a sensor for providing said at least two sets of image data to said processor;

said processor determining automatically a set of default settings for said sensor based on a blank image;

said processor adjusting automatically said set of default settings based on variable conditions present when capturing an image of the individual feature; and means for combining said at least two sets of image data to form a resultant image, wherein said processor includes means for calculating average intensity values for at least two regions comprising an image area of said sensor;

means for computing a variance for each of said regions to establish uniformity across said image area; and means for adjusting sensor device settings until the minimum intensity in an original intensity range of said blank image is translated to zero and said original range is expanded to occupy a full intensity range such that maximum contrast capability is provided.

9. A solid state fingerprint sensing device for sensing and analyzing a fingerprint, comprising:

a solid state sensor for providing fingerprint image data; and a processor for analyzing said fingerprint image data, said processor determining automatically a set of default settings for said sensor based on a blank image;

said processor including adjustment means for adjusting automatically said set of default settings based on variable conditions present when capturing a fingerprint image of the fingerprint;

said processor including diagnostic correction means for storing diagnostic data collected from said sensor based on the blank image, said diagnostic correction means correcting at least one set of fingerprint image data received form said sensor when said sensor is set with at least one set of adjusted settings, said processor including means for combining said at least one set of fingerprint image data with at least one additional set of fingerprint image data to form a resultant image, said at least one additional set of fingerprint image data corresponding to at least one additional set of adjusted settings, wherein said at least one additional set of adjusted settings differs from at least one other set of settings.

10. The device according to claim 9, wherein said fingerprint image data comprises multiple regions, said means for combining using intensity translated weighting for each of said multiple regions to combine said at least one set of fingerprint image data with said at least one additional set of fingerprint image data.

11. The device according to claim 9, wherein said means for combining combines said multiple sets of fingerprint image data by taking an average of said multiple sets of fingerprint image data to obtain said resultant image.

12. The device according to claim 6, wherein said processor includes an analyzer for examining contrast levels of partially captured fingerprint image data from said sensor.

13. The device according to claim 6, wherein said processor includes an analyzer for examining fingerprint image contrast levels by looking at grey levels of partially captured fingerprint image data.

14. The device according to claim 9, wherein said adjustment means captures at least two regions of data from multiple regions of fingerprint image data and creates a grey level histogram of said at least two regions of data to examine contrast levels of the fingerprint image captured.

15. The device according to claim 9, wherein said diagnostic correction means corrects said at least one set of fingerprint image data received from an optimally set sensor by substituting non-functional areas of pixels with average intensity values from neighboring pixels.

16. The device according to claim 9, wherein said diagnostic correction means maintains a history file for said diagnostic data to track sensor degradation.

17. The device according to claim 9, wherein said processor subtracts out a background noise image from said at least one set of fingerprint image data.

18. A method for sensing and analyzing an individual feature, said method comprising the steps of:

automatically determining a set of default settings for a sensor device based on a blank image;

automatically adjusting said set of default settings based on variable conditions that may be present when capturing an image of the individual feature;

capturing multiple images at a corresponding set of settings; and combining said multiple images to form a resultant image, wherein at least one of the corresponding set of settings differs from at least one other corresponding set of settings, including the further step of weighting the images according to quality parameters.

19. A method for optimizing an image of an individual feature, comprising the steps of:

determining a set of default settings for a sensor device;

capturing a first image of the individual feature at a first set of settings;

capturing at least one additional image of the individual feature at a differing set of settings;

weighting the captured images according to quality parameters; and combining the weighted images to form a resultant image.

20. An apparatus for sensing and analyzing an individual feature, said apparatus comprising:

a processor for analyzing at least two sets of image data;

a sensor for providing said at least two sets of image data to said processor;

said processor determining automatically a set of default settings for said sensor based on a blank image;

said processor adjusting automatically said set of default settings based on variable conditions that may be present when capturing an image of the individual feature; and, means for combining said at least two sets of image data to form a resultant image, wherein the two sets of image data differ from each other and wherein the means for combining the at least two sets of image data includes the processor executing instructions, the processor further operable to weight the image data according to quality parameters and to combine the weighted images.

* * * * *